United States Patent [19]
Surugucchi et al.

[11] Patent Number: 6,094,699
[45] Date of Patent: Jul. 25, 2000

[54] APPARATUS AND METHOD FOR COUPLING DEVICES TO A PCI-TO-PCI BRIDGE IN AN INTELLIGENT I/O CONTROLLER

[75] Inventors: Krishnakumar Rao Surugucchi; Geeta George, both of Fremont, Calif.

[73] Assignee: Mylex Corporation, Fremont, Calif.

[21] Appl. No.: 09/023,361

[22] Filed: Feb. 13, 1998

[51] Int. Cl.[7] .............................. G06F 13/38; G06F 13/40
[52] U.S. Cl. ....................... 710/128; 710/126; 710/129; 711/173
[58] Field of Search .................................. 710/128, 126, 710/129; 711/153, 173, 170, 171, 172

[56] References Cited

U.S. PATENT DOCUMENTS

| | | | |
|---|---|---|---|
| 4,827,406 | 5/1989 | Bischoff et al. | 711/153 |
| 5,148,527 | 9/1992 | Basso et al. | 710/129 |
| 5,261,077 | 11/1993 | Duval et al. | 395/500 |
| 5,542,055 | 7/1996 | Amini et al. | 710/10 |
| 5,694,556 | 12/1997 | Neal et al. | 710/128 |
| 5,848,249 | 12/1998 | Garbus et al. | 710/128 |
| 5,872,942 | 2/1999 | Swanstrom et al. | 710/129 |

FOREIGN PATENT DOCUMENTS

| | | | |
|---|---|---|---|
| 0747829A1 | 12/1996 | European Pat. Off. | G06F 13/12 |
| 2324182A | 10/1998 | United Kingdom | G06F 13/12 |
| WO/99/21087 A1 | 4/1999 | WIPO | G06F 13/00 |
| WO99/21087 | 4/1999 | WIPO | G06F 13/00 |

*Primary Examiner*—Ario Etienne
*Attorney, Agent, or Firm*—Flehr Hohbach Test Albritton & Herbert LLP

[57] ABSTRACT

The present invention pertains to an apparatus and method for transparently coupling PCI devices behind a PCI-to-PCI bridge. A controller is coupled to a primary PCI bus and includes a secondary PCI bus that is coupled to the primary PCI bus by a PCI-to-PCI bridge. The secondary PCI bus includes a number of exposed PCI devices that are recognizable by the bridge and a number of hidden PCI devices that are hidden from the bridge. A bridge assist device (BASS) is one such exposed PCI device that is used to acquire a memory address space that is part of the system memory. The memory address space is then partitioned by the controller and assigned to each of the hidden PCI devices. The hidden PCI devices use the memory address space to transmit data to the local CPU. The controller also includes a local-to-PCI bridge that is coupled to the secondary PCI bus and a local bus including a memory and a processor. The local-to-PCI bridge acquires a second memory address space that is part of the system memory and which is used to transmit data between the hidden PCI devices and a local memory.

49 Claims, 16 Drawing Sheets

| 31 | 16 15 | | 0 | |
|---|---|---|---|---|
| Device ID | | Vendor ID | | 00h |
| Status | | Command | | 04h |
| Class Code | | | Revision ID | 08h |
| BIST | Header Type | Latency Timer | Cache Line Size | 0Ch |
| Base Address Registers | | | | 10h |
| | | | | 18h |
| Secondary Latency Timer | Subordinate Bus Number | Secondary Bus Number | Primary Bus Number | |
| Secondary Status | | I/O Limit | I/O Base | 1Ch |
| Memory Limit | | Memory Base | | 20h |
| Prefetchable Memory Limit | | Prefetchable Memory Base | | 24h |
| Prefetchable Base Upper 32 Bits | | | | 28h |
| Prefetchable Limit Upper 32 Bits | | | | 2Ch |
| I/O Limit Upper 16 Bits | | I/O Base Upper 16 Bits | | 30h |
| Reserved | | | | 34h |
| Expansion ROM Base Address | | | | 38h |
| Bridge Control | | Interrupt Pin | Interrupt Line | 3Ch |
| Reserved | | | | 40h-7Fh |

Rows 10h and 18h span: Configuration Header Space (00h–3Ch). 40h-7Fh: Device-specific Configuration Registers.

FIGURE 9

| 31 | | 16 | 15 | | 0 | |
|---|---|---|---|---|---|---|
| Device ID (BA55H) | | | Vendor ID(1069H) | | | 00h |
| Status (medium devsel) | | | Command (memspace) | | | 04h |
| Class Code (raid) | | | | Revision ID (00) | | 08h |
| BIST | Header Type | | Latency Timer | | Cache Line Size | 0Ch |
| PCI Memory Base Address | | | | | | 10h |
| Reserved | | | | | | 14h |
| Reserved | | | | | | 18h |
| Reserved | | | | | | 1Ch |
| Reserved | | | | | | 20h |
| Reserved | | | | | | 24h |
| Reserved | | | | | | 28h |
| Reserved | | | | | | 2Ch |
| Reserved | | | | | | 30h |
| Reserved | | | | | | 34h |
| Reserved | | | | | | 38h |
| Max_Lat | Min_Gnt | | Interrupt Pin (no interrupt) | | Interrupt Line | 3Ch |
| Reserved | | | | | | 40h-7Fh |

FIGURE 10

| 31 | | 16 15 | | |
|---|---|---|---|---|
| Device ID (BAFFH) | | Vendor ID(1069H) | | 00h |
| Status (medium devsel) | | Command (memspace) | | 04h |
| Class Code (none) | | | Revision ID (00) | 08h |
| BIST | Header Type | Latency Timer | Cache Line Size | 0Ch |
| PCI Memory Base Address | | | | 10h |
| Reserved | | | | 14h |
| Reserved | | | | 18h |
| Reserved | | | | 1Ch |
| Reserved | | | | 20h |
| Reserved | | | | 24h |
| Reserved | | | | 28h |
| Reserved | | | | 2Ch |
| Reserved | | | | 30h |
| Reserved | | | | 34h |
| Reserved | | | | 38h |
| Max_Lat | Min_Gnt | Interrupt Pin (INTA) | Interrupt Line | 3Ch |
| BASS 1 Memory Base Register | | | | 40h |
| BASS 1 Memory Mask Register | | | | 44h |
| Reserved | RETRY_INTEN | INTSTS | | 48h |
| Reserved | | | | 4Ch-7Fh |

FIGURE 11

The INTSTS (interrupt status) register (offset 48H) bit assignments are as follows:

| Bit | Name | Description |
|---|---|---|
| 0 | BASS_1_RD_INTSTS | A '1' in this bit position indicates that a read access has been attempted on the first configuration register space 258 when the BASS1_RETRYEN bit was '1'. The bit will be cleared when BASS1_RETRYEN bit is '0'. |
| 1 | BASS_1_WR_INTSTS | A '1' in this bit position indicates that a write access has been attempted on the first configuration register space 258 when the BASS1_RETRYEN bit was '1'. The bit will be cleared when BASS1_RETRYEN bit is '0'. |
| 2 | MEM_RD_INTSTS | A '1' bit in this bit position indicates that a read access has been attempted on the configuration address space 248 accessed by the MEMIDSEL signal when MEM_RETRYEN bit was '1'. The bit will be cleared when MEM_RETRYEN bit is '0'. |
| 3 | MEM_WR_INTSTS | A '1' in this bit position indicates that a write access has been attempted on the configuration address space 248 accessed by the MEMIDSEL signal when MEM_RETRYEN bit was '1'. The bit will be cleared when MEM_RETRYEN bit is '0'. |
| 4-7 | Reserved | Read always return '0'. Writes must be '0'. |

FIGURE 12

The RETRY_INTEN (retry enable) register (offset 49H) bit assignments are as follows:

| Bit | Name | Description |
|---|---|---|
| 0 | BASS1_INTEN | When this bit is a '1', an interrupt is generated on every access to the first configuration address space 258 if BASS1_RETRYEN bit is a '1'. When this bit is a '0', the interrupt is disabled. (Default = 1, interrupt disabled). |
| 1 | MEM_INTEN | When this bit is a '1', an interrupt is generated on every access to the first configuration address space 248 accessed through the MEMIDSEL signal when the MEM_RETRYEN bit is a '1'. When this bit is a '0', the interrupt is disabled. (Default = 1, interrupt disabled). |
| 2 | BASS1_RETRYEN | When this bit is '1', a PCI retry is signaled on any access to the first configuration address space 258. When this bit is a '0', configuration accesses are permitted and terminate normally. Interrupt status register bits corresponding to the first configuration address space 258 will be cleared when this bit is 0. (Default = 1, interrupt disabled). |
| 3 | MEM_RETRYEN | When this bit is '1', a PCI retry is signaled on any access to the second configuration address space 248 accessed through the MEMIDSEL signal. When this bit is a '0', configuration accesses to the configuration address space 248 are permitted. The termination is controlled by the local CPU 214. Interrupt status register bits corresponding to MEM_INTEN will be cleared when this bit is 0. (Default = 1, interrupt disabled). |
| 4-7 | Reserved | Reads always return '0'. Writes return '0'. |

FIGURE 13

APPARATUS AND METHOD FOR COUPLING DEVICES TO A PCI-TO-PCI BRIDGE IN AN INTELLIGENT I/O CONTROLLER

BRIEF DESCRIPTION OF THE INVENTION

The present invention relates generally to peripheral controllers. More particularly, the invention relates to providing a mechanism for coupling devices to a PCI-to-PCI bridge.

BACKGROUND OF THE INVENTION

The proliferation of client/server architectures has led to the increased concern to improve the performance of these architectures. A bottleneck to the client/server architecture is the I/O performance in accessing peripheral devices such as local area network (LAN) devices, small computer system interface (SCSI) devices, motion video devices, and the like.

The Peripheral Component Interconnect (PCI) bus is a bus architecture developed to address the I/O performance issues associated with personal computers. The PCI bus provides a direct connection to peripheral devices, such as LAN and SCSI devices, on the system backplane. The PCI bus also allows intelligent I/O devices, such as RAID controllers and the like, to be connected directly on the system backplane. This configuration is advantageous for improving the speed in accessing peripheral devices.

FIG. 1 illustrates a prior art data processing system 100 utilizing a RAID controller 102 that plugs into one of the host system's PCI bus slots and connects to one or more SCSI controllers 104A–104N. The RAID controller 102 includes a PCI bus interface 106 that interfaces between the host system's primary PCI bus 108 and a local CPU 110 located on a local bus 112. The PCI bus interface 106 enables data transfers between the primary PCI bus 108 and the local CPU 110 connected to the local bus 112. A memory 114 and one or more SCSI controllers 104A–104N are also connected to the local bus 112. The memory 114 is used to store data that is transmitted between a SCSI controller 104 and the primary PCI bus 108 and between the local CPU 110 and the SCSI controllers 104. A SCSI controller 104 can be an I/O processor that is coupled to one or more SCSI channels 115A–115N that include one or more peripheral devices 11 6A- 116N such as disk drives, CD-ROM and DAT tape drives, and the like.

In this particular controller design, all I/O activity utilizes the memory 114.

For example, data that is to be written to a particular SCSI controller 104 is transmitted from the primary PCI bus 108 and stored in the memory 114. The local CPU 110 initiates the appropriate actions to add parity to the data which is then stored in the intended SCSI controller 104. Data that is read from a SCSI controller 104 is stored in the memory until such time as the data can be transmitted on the primary PCI bus 108 to the host system (not shown). The use of the memory 114 for each I/O data transfer increases the traffic on the local bus 112. This increased bus traffic limits the use of the local bus 112 by the local CPU 110 and prevents it from accomplishing its tasks in a timely fashion.

FIG. 2 illustrates a second prior art data processing system 120 configured to overcome the I/O performance problem identified in the first prior art data processing system. There is shown a RAID controller 122 that is connected to the primary or host system PCI bus 124 and to a number of SCSI controllers 126A–126N by a secondary PCI bus 128. A SCSI controller 126 is connected to one or more SCSI channels 125A–125N which in turn are connected to one or more peripheral devices 127A–127N. The RAID controller 122 uses an Intel 80960 RP™ (i960 RP) processor 130 and a memory 132 to support data transfers between the host CPU (not shown) and the SCSI controllers 126. The memory is coupled to the processor 130 by a local bus 131. The i960 RP processor 130 provides a PCI-to-PCI bridge to interface between the primary 124 and secondary PCI 128 buses, a processor core, DMA support and interrupt handling, as well as other components.

The use of the local and secondary PCI buses in this configuration overcomes the bus traffic bottleneck experienced in the first prior art system. In addition, the use of the i960 RP processor 130 is advantageous since it frees the host system CPU of handling interrupt-driven 1/0 processing tasks as well as reduce the congestion on the primary PCI bus 124. However, a drawback with the RAID controller 122 in this configuration is that it is constrained to the performance limitations of the i960 RP. The i960 RP operates at a processor speed ranging from 33 Mhz to 66 Mhz which is substantially slower than host processor speeds which currently range between 233 Mhz–300 Mhz. Thus, the use of the i960 RP constrains the I/O bandwidth that can be achieved by the RAID controller 122.

Accordingly, there is a need for a mechanism for coupling intelligent I/O devices to the PCI bus in an efficient manner which can overcome these shortcomings.

SUMMARY OF THE INVENTION

The present invention pertains to an apparatus and method for coupling PCI devices behind a standard PCI-to-PCI bridge. A controller is coupled to a primary PCI bus and includes a secondary PCI bus that is coupled to the primary PCI bus by a PCI-to-PCI bridge. On the upstream side of the PCI-to-PCI bridge is a host system including a host CPU and a system memory. On the downstream side of the PCI-to-PCI bridge is a secondary PCI bus including one or more PCI devices. A number of the PCI devices are exposed to the PCI-to-PCI bridge and a number of the PCI devices are hidden from the PCI-to-PCI bridge.

In a preferred embodiment of the present invention, the controller is an intelligent I/O controller such as a RAID controller. The hidden PCI devices are interface controllers such as a PCI-to-SCSI controller that includes one or more SCSI channels coupled to various types of peripheral devices. Each of the interface controllers requires memory space to communicate with the local CPU. This memory space is a part of the system memory space. However, as these devices are hidden from the host CPU, this space is not directly assigned by the host CPU.

A bridge assist device (BASS) is an exposed PCI device that is used to acquire the system memory address space required by the interface controllers. The memory address space is then partitioned by the RAID controller and assigned to each of the hidden PCI devices. The BASS appears to the host system as a device with a memory space requirement which is the sum total of the space needed by the interface controllers. In reality, the BASS is a dummy device and does not use this space.

The RAID controller also includes a Local-to-PCI bridge that is coupled to the secondary PCI bus and a local bus that includes a memory and a local CPU. The Local-to-PCI bridge is an exposed PCI device that acquires a second memory address space that is part of the system memory and which is used to transmit data between the interface controllers and the local memory.

Each PCI device includes a configuration register space. The IDSEL signals that access each PCI device are configured such that the PCI-to-PCI bridge can only access the IDSEL signals for the exposed PCI devices, such as the BASS and the Local-to-PCI bridge. The IDSEL signals for the hidden PCI devices are generated by the Local-to-PCI bridge and are under the control of the local CPU.

The BASS has two configuration register spaces. The first configuration register space is used to acquire the memory address space for the hidden PCI devices and is accessible by the host system through a BASS IDSEL signal. The second configuration register space is accessed by the local CPU through a CTLIDSEL signal that is generated by the Local-to-PCI under the control of the local CPU. The second configuration register space is used to write data into the first configuration register space and to read from the first configuration register space. Such access is needed in order for the controller to allocate the memory space to the hidden PCI devices.

After system configuration is performed, a reconfiguration of the system memory address spaces can occur. In this case, the technology of the present invention permits the reconfiguration when the secondary PCI bus is in a quiescent state. The controller then reconfigures the hidden device's memory space in response to the reconfiguration.

BRIEF DESCRIPTION OF THE DRAWINGS

For a better understanding of the nature and objects of the invention, reference should be made to the following detailed description taken in conjunction with the accompanying drawings, in which:

FIG. 9 illustrates an exemplary format of a PCI configuration register space used by a PCI-to-PCI bridge in a preferred embodiment of the present invention.

FIG. 10 illustrates an exemplary format of the first configuration register space of the BASS in a preferred embodiment of the present invention.

FIG. 11 illustrates an exemplary format of the second configuration register space of the BASS in a preferred embodiment of the present invention.

FIG. 12 illustrates the interrupt status register settings in accordance with a preferred embodiment of the present invention.

FIG. 13 illustrates the retry enable register settings in accordance with a preferred embodiment of the present invention.

Like reference numerals refer to corresponding parts throughout the several views of the drawings.

DETAILED DESCRIPTION OF THE INVENTION

Figure 1:
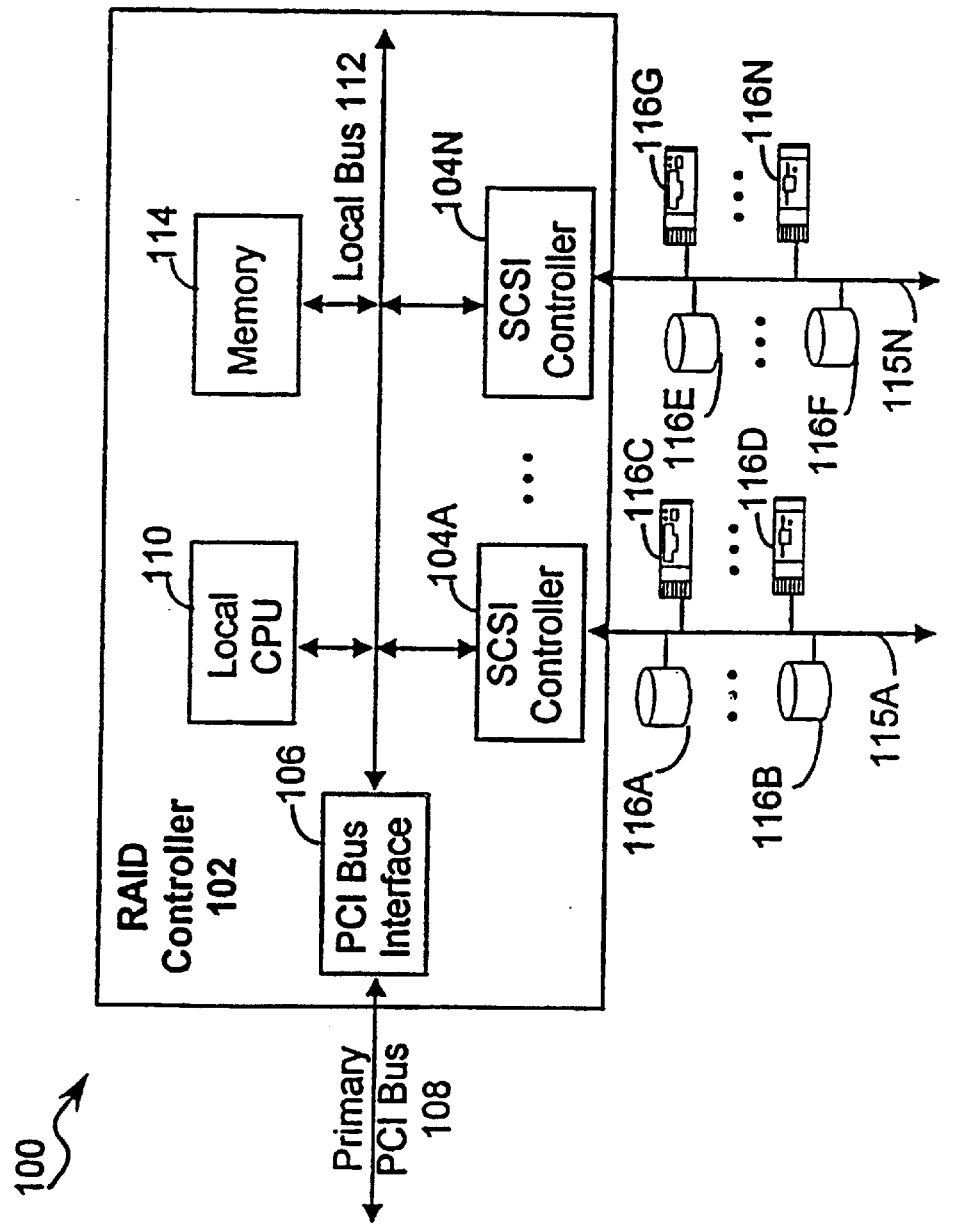
FIGS. 1–2 illustrate prior art RAID controllers.
Figure 2:
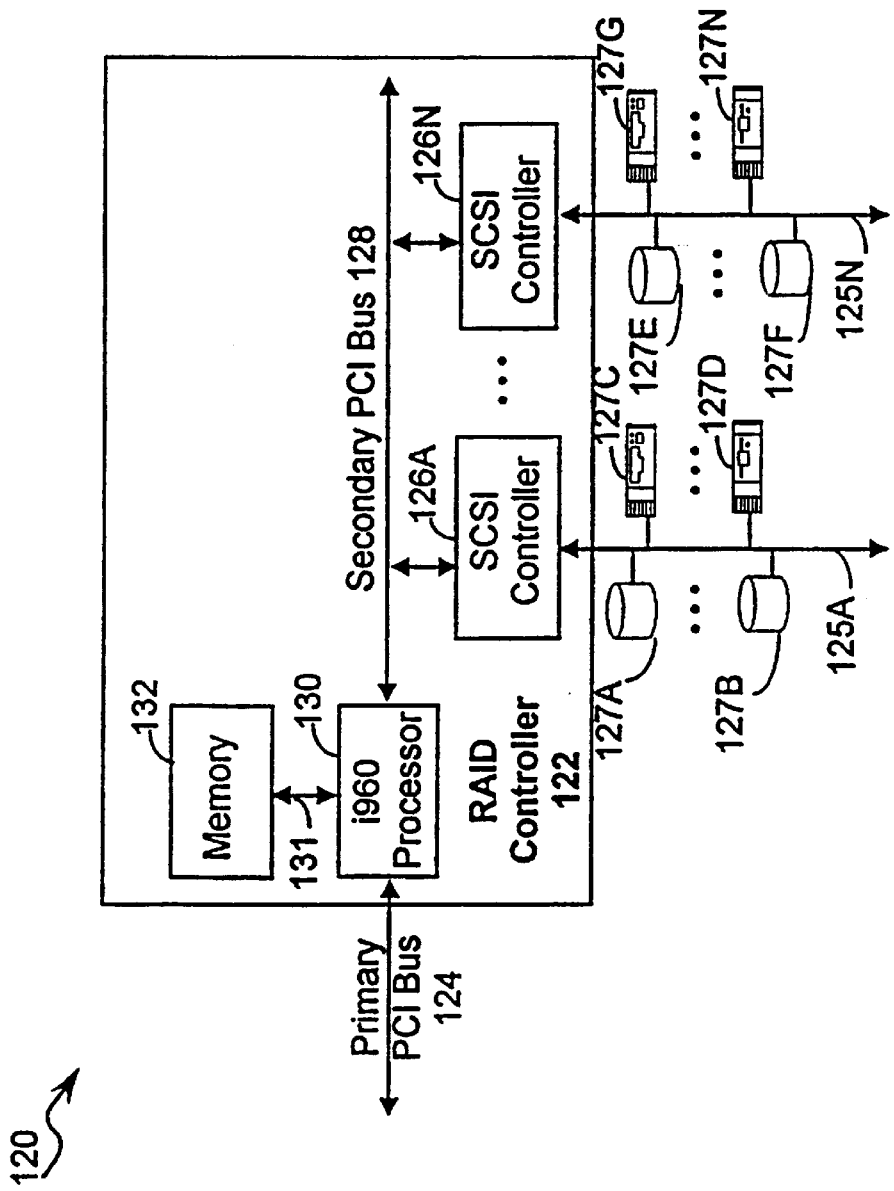
Figure 3:
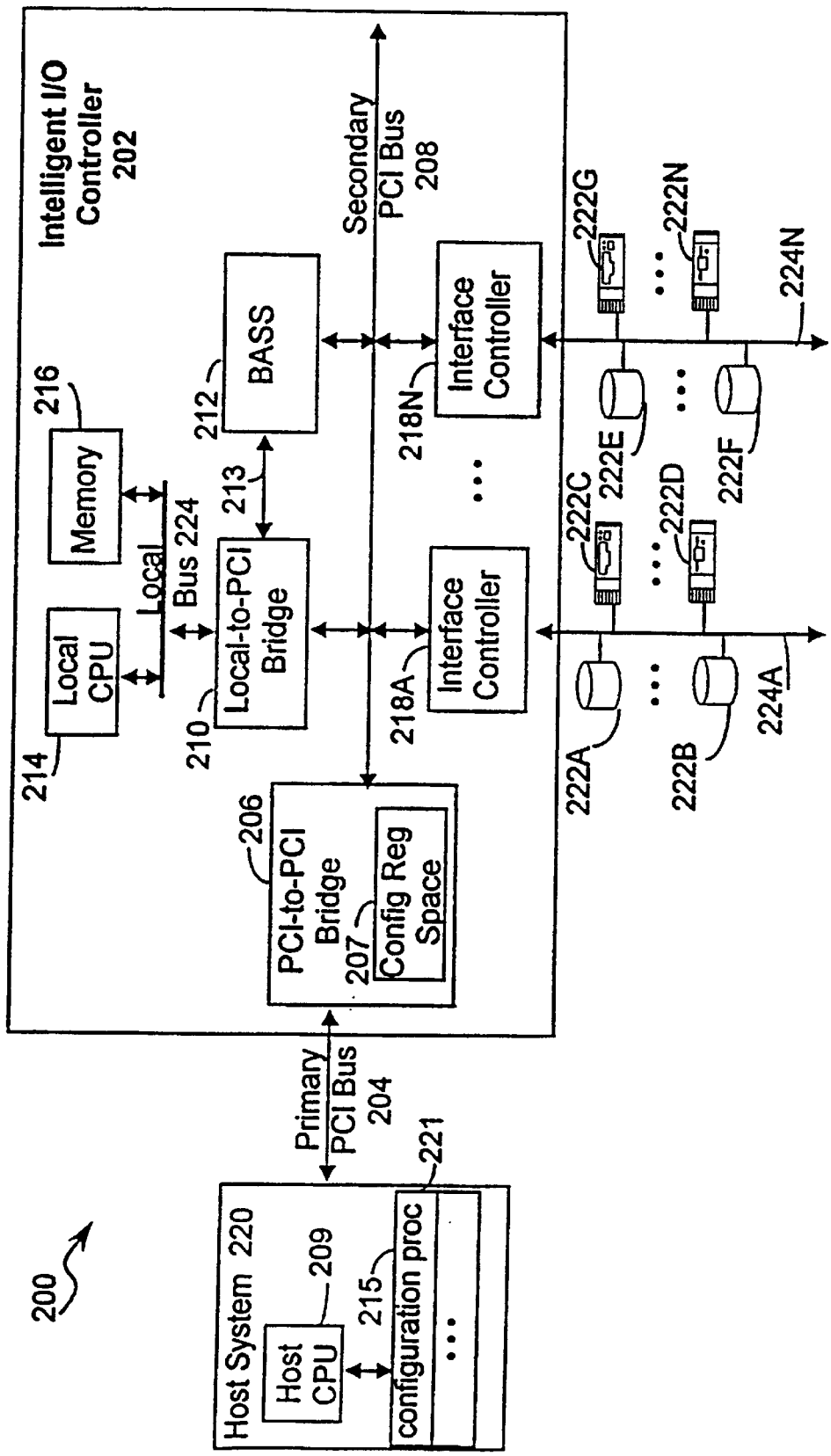
FIG. 3 illustrates an intelligent I/O controller in accordance with a preferred embodiment of the present invention.

FIG. 3 illustrates a data processing system 200 employing the technology of the present invention. There is shown an intelligent I/O controller 202 coupled to a primary PCI bus 204. The intelligent I/O controller 202 can be a RAID controller, a network controller, and the like. The intelligent I/O controller 202 includes a PCI-to-PCI bridge 206, a secondary PCI bus 208, and one or more interface controllers 218A–218N. The PCI-to-PCI bridge 206 provides a link between a primary PCI bus 204 and a secondary PCI bus 208. A host system 220 is connected to the upstream side of the PCI-to-PCI bridge 206 through the primary PCI bus 204. The host system 220 includes a host CPU 209 and a memory 215. In a preferred embodiment, the PCI-to-PCI bridge 206 can be one of the 2115x family of bridges from Digital Semiconductor.

The primary 204 and secondary 208 PCI buses are operated in accordance with the PCI system architecture. A description of the PCI system architecture can be found in the PCI Specification Rev. 2.1 provided by the PCI Special Interest Group (http://www.pcisig.com), in MindShare, Inc., PCI SYSTEM ARCHITECTURE, third edition, Addison Wesley (1995), and in Edward Solari, PCI HARDWARE AND SOFTWARE ARCHITECTURE AND DESIGN, third edition, Annabooks, (1996), all of which are hereby incorporated by reference. In addition, the PCI-to-PCI bridge 206 is configured and operated in accordance with the PCI-to-PCI Specification Rev. 1.0 provided by the PCI Special Interest Group which is hereby incorporated by reference.

The interface controllers 218 can include devices such as but not limited to a PCI-to-SCSI controller, a PCI-to-Fibre Channel controller, a PCI-to-Ethernet controller, and the like. Each of the interface controllers 218 are connected to an interconnect structure having one or more peripheral devices 222. In a preferred embodiment, the interface controllers 218 are PCI-to-SCSI controllers each of which can include one or more SCSI channels 224A–224N. Each SCSI channel 224 contains one or more peripheral devices 222A–222N such as but not limited to disk drives, tape drives, various types of optical disk drives, printers, scanners, processors, communication devices, medium changers, and the like.

The intelligent I/O controller 202 includes a Bridge Assist Device (BASS) 212, a Local-to-PCI bridge 210, a local CPU 214, and a memory 216. The BASS 212 is coupled to the secondary PCI bus 208 and is coupled to the Local-to-PCI bridge 210 through several radial signals 213. The Local-to-PCI bridge 210 is coupled to the secondary PCI bus 208 and the local bus 224. The local CPU 214 and memory 216 are connected to a local bus 224. The local CPU 214 can be any type of microprocessor or processing unit. Preferably, the local CPU 214 is the Strong ARM SA-110 processor from Digital Semiconductor.

Figure 4:
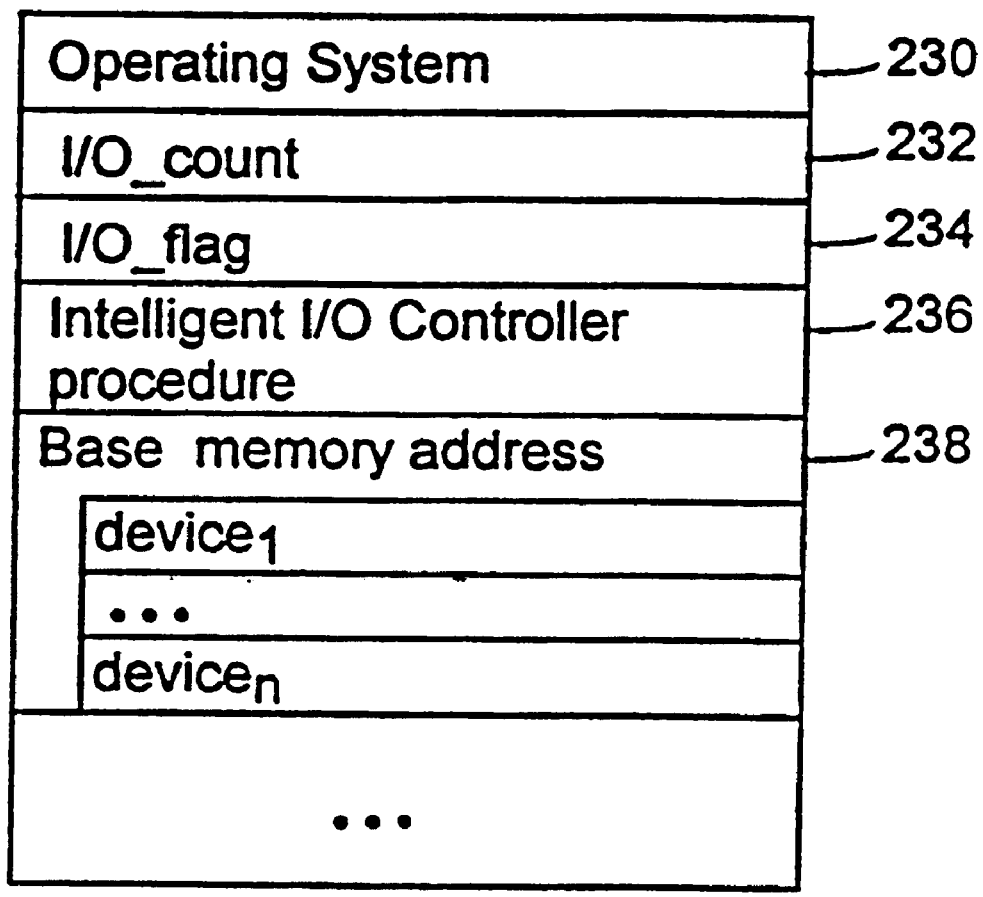
FIG. 4 illustrates a memory used in the intelligent I/O controller shown in FIG. 3.

The memory 216 may be implemented as RAM (random access memory) or a combination of RAM and non-volatile memory such as flash ROM (read only memory). Referring to FIG. 4, the memory 216 can include the following:

an operating system 230;

an I/O_count 232 which is a count of the number of I/O related transactions that are currently being processed by the intelligent I/O controller 202;

an I/O flag 234 which indicates that the intelligent I/O controller 202 can initiate I/O activity;

an intelligent I/O controller procedure 236 that controls the operation of the intelligent I/O controller 202;

a set of base memory addresses 238, each base memory address is associated with a particular hidden PCI device; and as well as other procedures and data.

Figure 5:
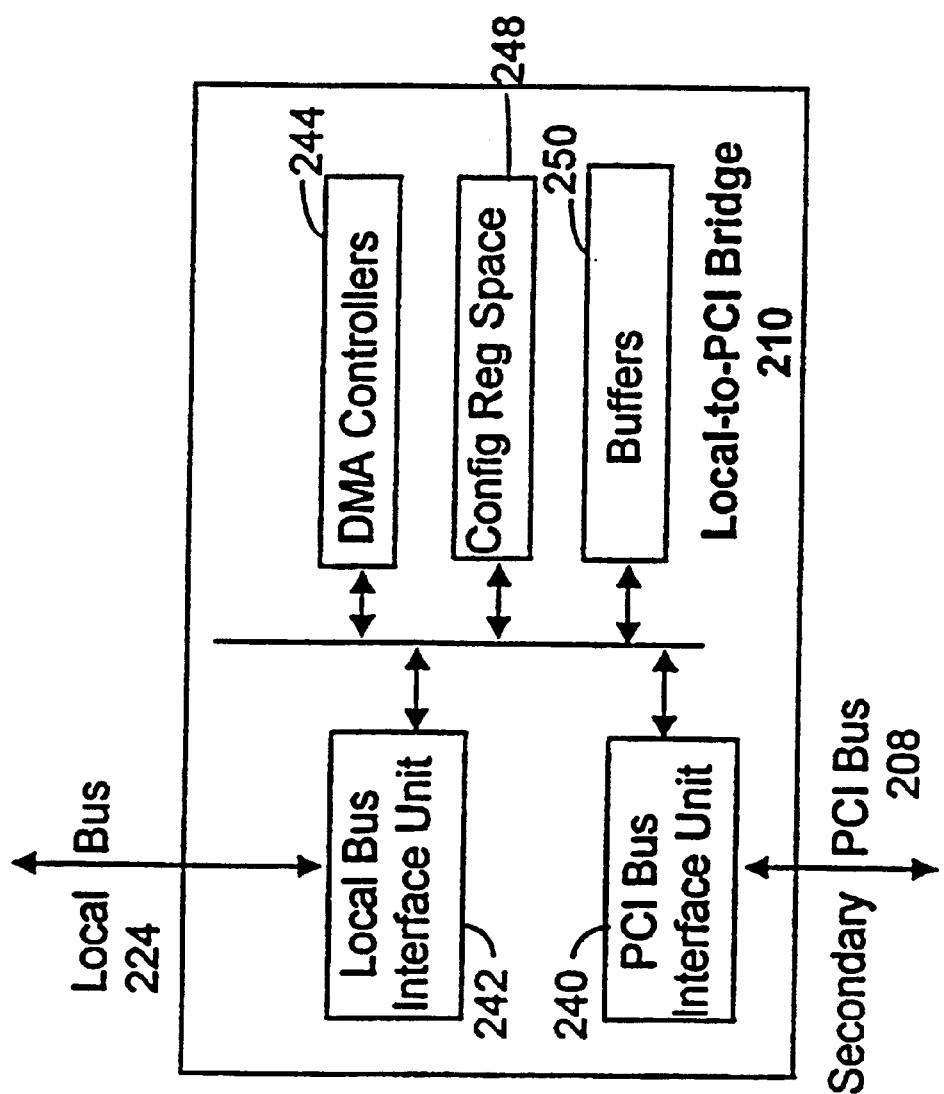
FIG. 5 illustrates the components of the Local-to-PCI bridge used in the intelligent I/O controller shown in FIG. 3.

FIG. 5 illustrates the components of the Local-to-PCI bridge 210. There is shown a PCI bus interface 240, a local bus interface 242, one or more DMA controllers 244, a configuration register space 248, and one more buffers 250. The PCI bus interface 240 is used to interact with the secondary PCI bus 208; the local bus interface 242 interacts with the local bus 224; the DMA controllers 244 are used to perform data transfers between the local memory 216 and the host system memory 215; the buffers 250 are used to temporarily store data transmitted between the local bus 224 and the secondary PCI bus 208; and the configuration register space 248 will be described in more detail below.

The configuration register space 248 is used to obtain memory space that is used to transmit data between the interface controllers 218 and the local memory 216. An interface controller 218 can access the local memory 216 in order to obtain control structures, such as SCSI commands, that direct the interface controller 218 to operate in an intended manner. In addition, the local memory 216 is used in the generation of parity bytes that are appended to data which is transmitted to the interface controller. As such, this memory space allows access by the interface controllers 218 to the local memory 216 without the intervention of the local CPU 214.

Figure 6:
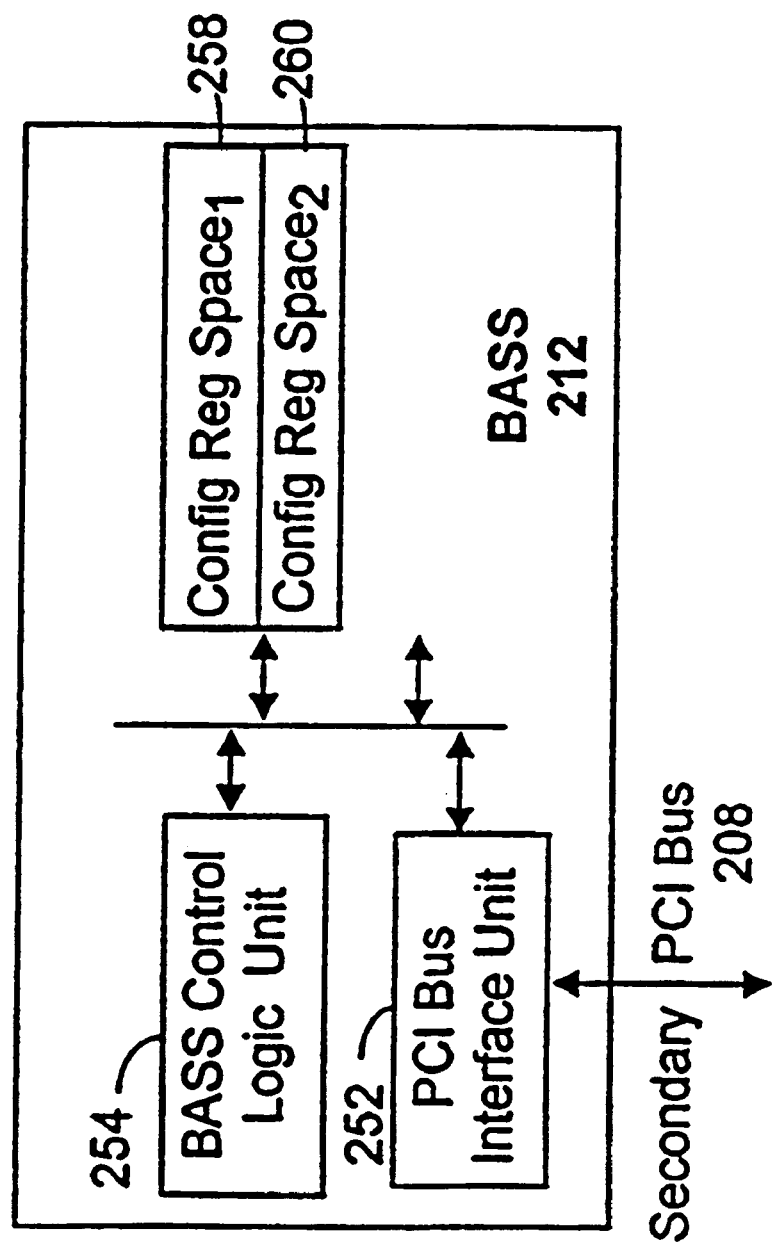
FIG. 6 illustrates the components of the BASS used in the intelligent I/O controller shown in FIG. 3.

FIG. 6 illustrates the components of the BASS 212. There is shown a PCI bus interface 252, a BASS control logic unit 254, a first configuration register space 258 and a second register configuration space 260. The PCI bus interface unit 252 interacts with the secondary PCI bus 208, the BASS control logic unit 254 controls the operation of the BASS 212, and the configuration registers spaces 258, 260 will be described below.

Figure 7:
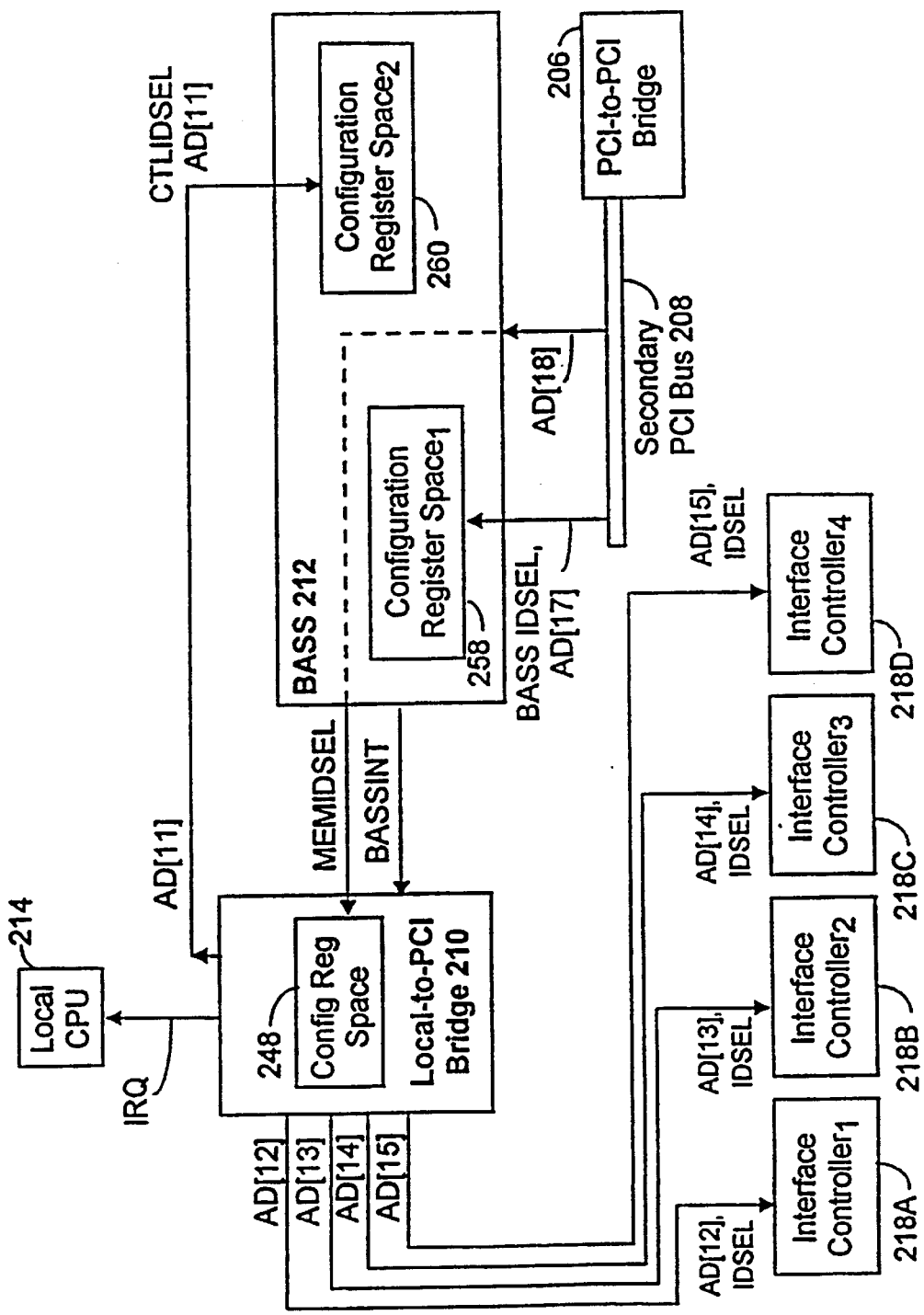
FIG. 7 illustrates the interconnection of the IDSEL signals used within the intelligent I/O controller in a preferred embodiment of the present invention.

FIG. 7 illustrates the interconnection of the IDSEL signals between the BASS 212, the Local-to-PCI bridge 210, and the PCI-to-PCI bridge 206. The secondary PCI bus 208 includes a PCI Address and Data (AD) bus that consists of thirty-two address signal lines. In a preferred embodiment, the upper sixteen address signal lines, AD[31:16], are available for use as Initialization Device Select (IDSEL) signals. An IDSEL signal is used as a chip select to access a PCI device's configuration register space. In the preferred embodiment, AD[17] is used as the IDSEL input for the host system to access the BASS's configuration register space 258 and AD[18] is used as the IDSEL input for the host system 220 to access the Local-to-PCI bridge's configuration address space 248. The IDSEL input, AD[18], is hereinafter referred to MEMIDSEL and the IDSEL input, AD[17], is hereafter referred to as BASS IDSEL. The MEMIDSEL signal is gated through the BASS 212 to the Local-to-PCI bridge 210. The BASS IDSEL signal is used to access the BASS's first configuration register space 258 and the MEMIDSEL is used to access the Local-to-PCI Bridge's configuration register space 248.

The Local-to-PCI bridge 210 uses select address signal lines to access the configuration register spaces of the interface controllers 222 and the BASS 212. The address line AD[11] is used as the IDSEL signal to access the BASS's second configuration register address space 260 and is herein referenced to as CTLIDSEL. Address lines AD[12]–AD[15] are used to access the configuration register spaces of the interface controllers 218. Since these address lines are under the control of the Local-to-PCI bridge 210, these configuration address spaces are hidden from the secondary PCI bus 208 and the host system. The PCI-to-PCI bridge 206 does not assert address lines AD[11]–AD[15] during any configuration cycle thereby hiding the interface controllers 218 from the host system 220.

In addition, the BASS 212 generates a first interrupt signal, BASSINT, which is used to indicate to the Local-to-PCI bridge 210 that an attempt was made by the host system 220 to access the BASS's first configuration register space 258 and/or the configuration space 248 of the Local-to-PCI bridge 210. In response to the BASSINT signal, the Local-to-PCI bridge 210 generates a second interrupt signal, IRQ, which indicates the attempted access to the local CPU 214. The operation of these signals will be described in more detail below.

The host system 220 in the preferred embodiment has the capability to address three separate address spaces: memory, I/O, and a configuration address space. The configuration address space is used to identify and configure PCI devices, which are those devices connected to the primary and secondary PCI buses.

Each PCI device contains a set of configuration registers or configuration register spaces. The format of the configuration register space is defined in the PCI specification referred to above. In a preferred embodiment, the PCI-to-PCI bridge 206, the Local-to-PCI bridge 210, the BASS 212, and the interface controllers 218 each contain at least one configuration register space. Address lines AD[17] and AD[18] are configured such that they are the IDSEL signals that access the configuration register space for the BASS and Local-to-PCI bridge. They are accessible through the PCI-to-PCI bridge and as such are recognizable by the host system 220. Address lines AD[12] through AD[15] are configured as the IDSEL signals for the interface controllers 218 and as such hide the interface controllers 218 from the secondary PCI bus 208 and the host system 220 since they are not used as IDSEL signals by the PCI-to-PCI bridge 206.

Figure 8:
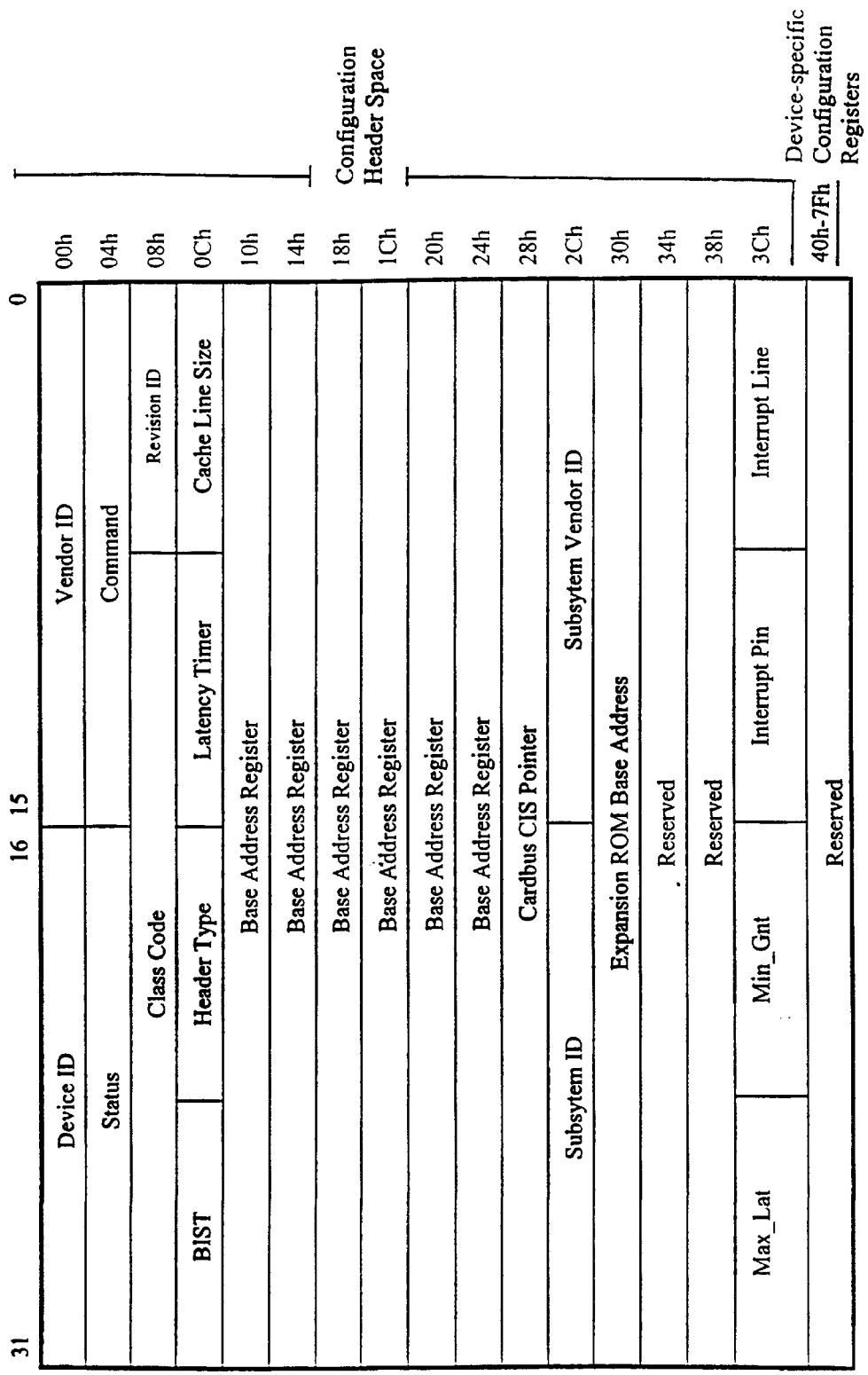
FIG. 8 illustrates an exemplary format of a PCI configuration register space used in a preferred embodiment of the present invention.

FIG. 8 illustrates the generic format of the configuration register space that is used for PCI devices other than a PCI-to-PCI bridge 206, preferably, the local-to-PCI bridge 210, the BASS 212, and the interface controllers 218. The 256-byte configuration register space includes two parts: (1) a 64-byte configuration header space that uniquely identifies the PCI device; and (2) a 192-byte device-specific configuration registers.

The configuration header space includes the following registers:

a vendor ID register that identifies the manufacturer of the device;

a device ID register that identifies the type of device which is assigned by the device manufacturer;

a command register that enables control over the device's ability to respond to and to perform PCI accesses;

a status register that tracks the status of PCI bus related events;

a revision ID register that identifies the revision number of the device which is assigned by the device manufacturer;

a class code register that identifies the basic function of the device through a series of predefined class codes;

a cache line size register that specifies the system cache line size;

a latency time that specifies the maximum amount of time the bus master can retain ownership of the bus;

a built-in-self-test (BIST) register which is used to control the testing of a PCI device;

base address registers which are used to indicate the system memory address space, I/O address space, or both;

a cardbus CIS pointer;

a subsystem identifier;

a subsystem vendor identifier;

an expansion ROM base address;

a max_lat register that specifies how often the device requires the PCI bus;

a min_gnt register that specifies for bus master devices the time needed by the device to retain PCI bus ownership in order to initiate a transaction;

an interrupt pin register that specifies which of the four PCI interrupt request pins the device is connected to; and an interrupt line register that specifies which of the system interrupt request lines the device's PCI interrupt request pin is routed to.

The device-specific configuration register space (i.e., locations 40h-7Fh) can be configured in any manner that is needed and in this example includes a set of reserved registers.

FIG. 9 illustrates the format of the configuration register space 207 for the PCI-to-PCI bridge 206. In this configuration register space 207, there is a memory limit register (offset 22h) which is used to identify the address limit of a memory mapped I/O address range and a memory base register (offset 20h) which identifies the base address of a memory mapped I/O address range. A more detailed description of this configuration register space can be found in the above-mentioned Solari reference at pages 565–615 which is hereby incorporated by reference.

The BASS 212 includes two configuration register spaces 258, 260. The first configuration register space 258 is accessed by the host system 220 through the AD[17] signal line which is its associated IDSEL signal line. The first configuration register space 258 is used to obtain memory address space that is used by the hidden PCI devices to communicate with the local CPU 214. In the preferred embodiment, these hidden PCI devices are the interface controllers 218. The memory address space is partitioned by the controller 202 and a portion is allocated to each of the respective interface controllers 218. The host system 220 does not access this memory address space although the memory address space is part of the host system's address space. If the memory address space were separate from the host system's address space, it would be necessary to modify some of the secondary PCI bus signals in order to prevent the PCI-to-PCI bridge 206 from forwarding secondary PCI cycles to the primary PCI bus 204. By keeping the interface controllers' memory address space as part of the host system's address space, the secondary PCI bus 208 can be utilized without modification.

The second configuration register space 260 is used to set the registers in the first configuration address space 258. A portion of the vendor-specific configuration registers in the second configuration space 260 is used to set values of the configuration header registers in the first configuration register space 258. By using two distinct configuration register spaces 258, 260, one for the host system 220 and a second for the local CPU 214, it is possible to retry accesses of the host system 220 to the configuration space 258 through control registers in the second vendor-specific configuration space 260 by the local CPU 214. In other words, the local CPU 214 can cause host system 220 accesses to the first configuration space 258 to be retried by controlling second configuration space 260 vendor-specific registers. The host system 220 uses the BASS IDSEL signal to access the first configuration register space 258. In order for the local CPU 214 to access the BASS's first configuration address space 258, the CTLIDSEL signal is used to access the second configuration space 260. The local CPU 214 does not use the BASS IDSEL signal. The CTLIDSEL signal is used to write to the vendor-specific configuration registers of the second configuration register space 260 which in turn are mapped into the corresponding registers in the first configuration register space 258. The CTLIDSEL signal is also used to read registers from the first configuration register space 258 by reading the corresponding register in the second configuration register space 260.

FIG. 10 illustrates an exemplary format of the first configuration register space 258. The following registers may be set under the control of the controller procedure 236 through the second configuration register space 260: (1) device id (offset 02h); (2) vendor id (offset 00h); and (3) mask for the PCI memory base address (location '10h'). In some embodiments of the invention, one or more of these registers may be hard coded and therefore need not be explicitly set under control of the controller procedure. For example, each of the device id and vendor id may be hard coded. In one particular embodiment, the device id is set to 'BA55H', the vendor id is set to '1069H' which indicates the vendor is the Mylex Corporation, and the PCI memory base address is set to obtain 64K bytes of memory.

In addition, the first configuration register space 258 specifies that there are no interrupts (i.e., Interrupt Pin (offset 3Dh) set to no interrupt). Also, a second base address register (i.e., Reserved field at offset 14h) can be optionally used to obtain I/O space if warranted. A read access to the reserved registers (i.e., 14h-38h and 40h-7Fh) returns a zero and a write access to the reserved registers has no effect.

FIG. 11 illustrates the format of the second configuration register space 260. The configuration header of the second configuration register space 260 shares the same format as shown in FIG. 8 and reflects the values that are in the first configuration register space 258. The BASS control logic unit 254 updates the registers in the second configuration register space 260 with the values in the first configuration space 258 when the values in the first configuration space 258 are set and/or modified.

The device-specific configuration registers (i.e., locations 40h-7Fh) are as follows:

a BASS 1 memory base register (offset 40h) which is used to read the PCI memory base address register (offset 10h) in the first configuration register space 258;

a BASS 1 memory mask register (offset 44h) which is used to set the PCI memory base address register (offset 10h) in the first configuration register space 258;

INTSTS (offset 48h), an interrupt status register which is used to instruct the BASS control logic unit 254 to enable/disable the BASSINT signal. FIG. 12 illustrates the bit settings for this register;

RETRY_INTEN (offset 49h), a retry enable register which is used to instruct the BASS control logic unit 254 to enable/disable a retry on the PCI secondary bus 208. FIG. 13 illustrates the bit settings for this register;

as well as other reserved registers (offset 4Ah-7Ch).

FIG. 12 illustrates the preferred settings for the interrupt status register and FIG. 13 illustrates the preferred settings for the retry enable register. The operation of these registers will be described in more detail below.

The foregoing description has detailed the hardware implementation of the data processing system employing the technology of the present invention. Attention now turns to the manner in which the system configures the PCI devices coupled to the PCI buses.

A configuration procedure 221 is executed by the host system 220 when the host system 220 is powered-on or bootup. The configuration procedure 221 scans all the devices connected to the primary 204 and secondary 208 PCI buses and determines the appropriate configuration requirements that are warranted. Specifically, the configuration procedure 221 allocates the number of blocks of memory and/or I/O address space a device requires as well as other functions. Each device is assigned a set of mutually-exclusive address ranges. The BASS 212 is used to obtain memory address space that is under the control of the local CPU 214. This memory address space is then partitioned by the local CPU 214 and configured for each of the hidden interface controllers 218. The interface controllers 218 require the memory space to communicate with the local CPU 214.

Figure 14:
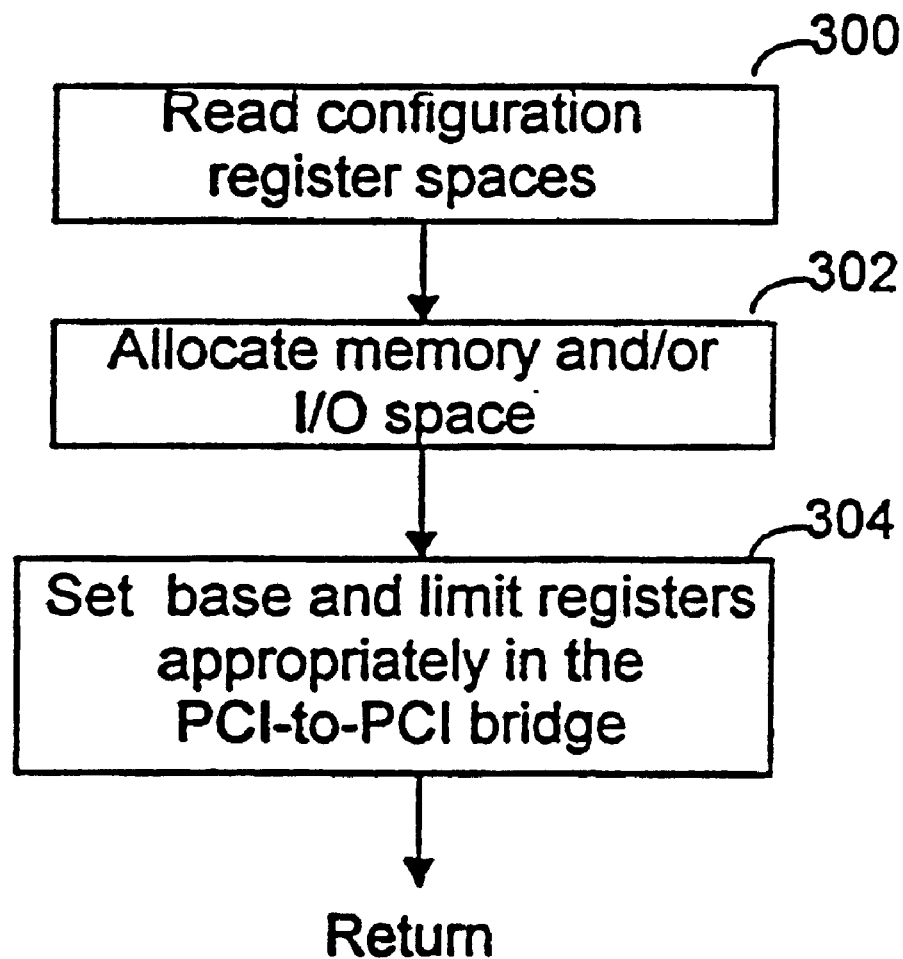
FIG. 14 is a flow chart illustrating the steps used by the host CPU to configure PCI devices in accordance with a preferred embodiment of the present invention.

FIG. 14 illustrates the steps used by the host system 220 to configure the devices connected to the secondary PCI bus 208. The host system's configuration procedure 221 reads the configuration register space of each device connected to primary 204 and secondary 208 PCI bus (step 300). Typically, this is accomplished through the use of configuration transactions that are issued on each respective bus. A more detailed discussion of these configuration transactions is described in MindShare, Inc., PCI SYSTEM ARCHITECTURE, third edition (1995), pages 297–328, which is hereby incorporated by reference. The configuration transactions are used to read certain data in the configuration register space in order to ascertain the presence of the device and the device type. In the preferred embodiment, the host system 220 will only recognize the BASS 212 and the Local-to-PCI bridge 210 due to the configuration of the IDSEL signal lines from the PCI-to-PCI bridge 206.

Once the device type has been determined, the configuration procedure 221 reads the respective configuration register space to determine the amount of memory and/or I/O space the corresponding device requires (step 302). The configuration procedure 221 then programs the device's memory and/or I/O address decoders to respond to the memory and/or 10 address ranges that are specific to the device. In addition, the configuration procedure 221 sets up the appropriate interrupt request lines for the device as well as program the device for bus mastering capability if so desired.

In the preferred embodiment, the Local-to-PCI bridge 210 and the BASS 212 are configured in accordance with their respective configuration register space. The configuration procedure 221 accesses the Local-to-PCI bridge's configuration register space 248 through the MEMIDSEL signal line. The configuration procedure 221 allocates a block of memory to the Local-to-PCI bridge 210 as specified by the PCI Memory Base Address in the Local-to-PCI bridge's configuration address space 248. This memory space is used to transfer data between the interface controllers 218 and the local memory 216. The base address of this memory space is then set in the PCI memory Base Address Register (offset 10h) of the Local-to-PCI bridge's configuration address space 248.

The host system 220 accesses the first configuration register space 258 of the BASS 212 through the BASS IDSEL signal and allocates a block of memory as specified in the PCI Memory Base Address register of the first configuration register space 258. This memory space is used by the interface controllers 218 to communicate with the local CPU 214. The base address of the memory space is set in the PCI Memory Base Address register (offset 10h) in the first configuration register space 248 (see FIG. 10). The BASS control logic unit 254 then updates the corresponding register (i.e., PCI Memory Base Address register, offset 10h) in the second configuration register space 260 with the same value (see FIG. 11).

After each device connected to the secondary PCI bus 208 has been configured by the configuration procedure 221, the configuration procedure 221 sets the PCI-to-PCI bridge's configuration register space 207 to reflect the memory space behind the bridge 206 (step 304). This is done by setting the memory limit and memory base registers in the PCI-to-PCI bridge's configuration register space 207 (see FIG. 9) to reflect the contiguous block of memory space that is allocated to the Local-to-PCI bridge 210 and BASS 212.

Figure 15:
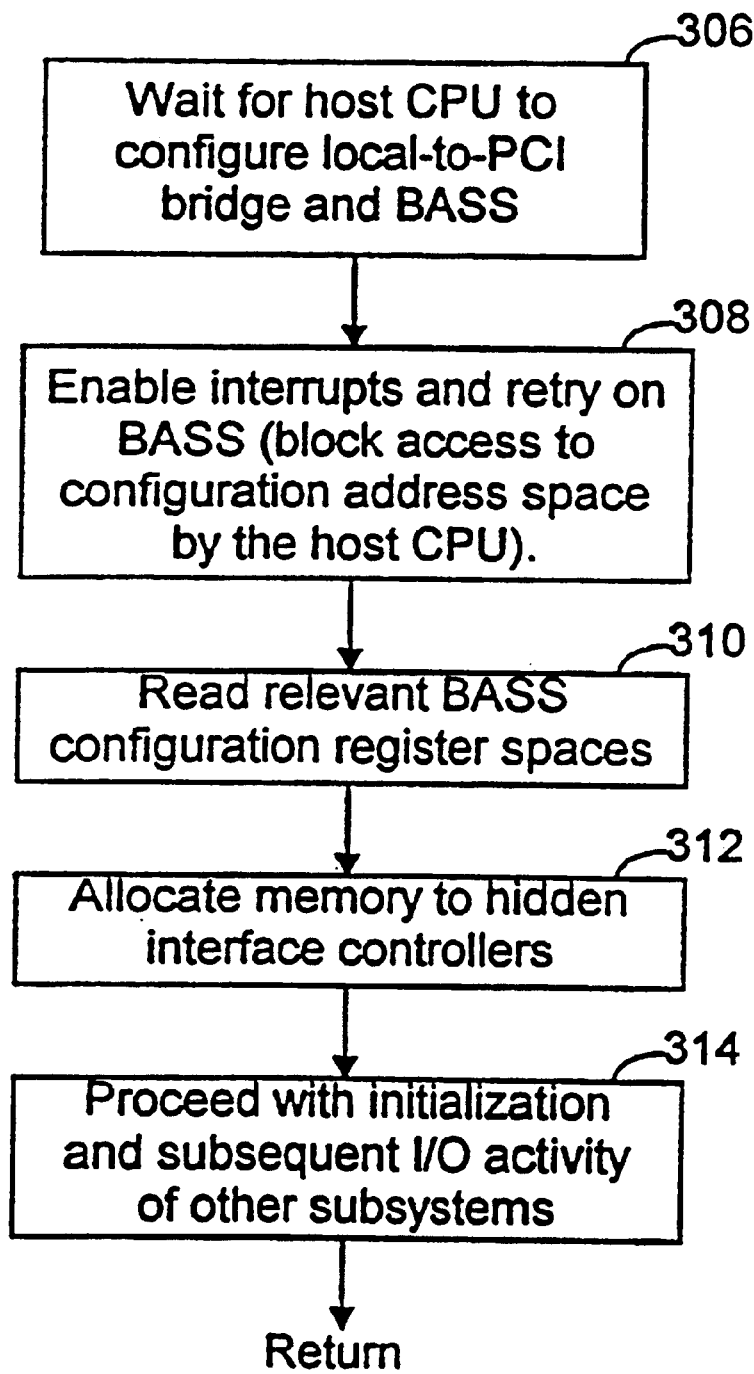
FIG. 15 is a flow chart illustrating the steps used by the local CPU to configure the hidden PCI devices in accordance with a preferred embodiment of the present invention.

FIG. 15 illustrates the steps used by the local CPU 214 to configure the hidden interface controllers 218 once the host system 220 configuration is completed. The controller procedure 236 waits until the configuration procedure 221 has configured the Local-to-PCI bridge 210 and the BASS 212 (step 306). Configuration by the host system 220 is completed when the command register (offset 04h) in both of the configuration register spaces 258, 260 for the Local-to-PCI bridge 210 and the BASS 212 is set to indicate that the memory space is enabled.

Next, the controller procedure 236 enables interrupts and retries on BASS 212, thereby blocking access to the configuration address spaces 258, 260 by the host CPU 209 (step 308). The controller procedure 236 initiates the appropriate instructions to enable the interrupt status register in the second configuration register space 260. The interrupt status register is set in accordance with the bit settings shown in FIG. 12. When the interrupt status register is enabled, the BASSINT signal is asserted whenever there is an access to the first configuration register space 258 and to the Local-to-PCI bridge's configuration register space 248 (see FIG. 12) (step 308).

Furthermore, the controller procedure 236 initiates the appropriate instructions to set the retry enable register in the second configuration register space 260 to perform a PCI retry whenever there is an access to the first configuration register space 258 and to the Local-to-PCI's configuration register space 248 (step 308). A PCI retry is performed when the STOP signal is asserted or the TRDY signal is not asserted. The appropriate settings for this register are shown in FIG. 13.

The controller procedure 236 reads the data in the second configuration register space 260 in order to ascertain the base address of the allotted memory space (see FIG. 11, offset 40h) (step 310). The controller procedure 236 initiates the appropriate instructions to access the contents of the second configuration register space 260 in order to determine the base address of the allotted memory space. This is accomplished through the use of the CTLIDSEL signal.

The controller procedure 236 then partitions the memory address space and allocates a portion for each hidden device (step 312). The controller procedure 236 stores in the memory 216 the base address for the partition of the memory space that is designated to each hidden device or interface controller 218. The controller procedure 236 then sets the configuration register space of each interface controller 218 to reflect the allotted memory space. This access is accomplished through the associated AD signal line that corresponds to the IDSEL signal for the respective interface controller 218.

Once the controller procedure 236 has completed configuring the interface controllers 218, the controller procedure 236 can proceed to process the I/O activity received on the secondary PCI bus 208 and those I/O transactions transmitted from the host system 220 through the primary PCI bus 204 (step 314).

After system initialization, reconfiguration of the devices associated with the primary 204 and secondary 208 PCI buses can occur during the runtime operation of the system. For instance, the operating system may perform its own configuration process and reconfigure the PCI devices in accordance with its own criteria. The Microsoft Windows NT™ operating system is an example of one such operating system that performs its own configuration process when the operating system boots up after the hardware configuration has taken place. In this situation, the operating system reconfiguration process needs to occur when there is no I/O activity on the secondary PCI bus 208 so that the configuration register space of each PCI device can be altered with minimal intrusion.

Figure 16:
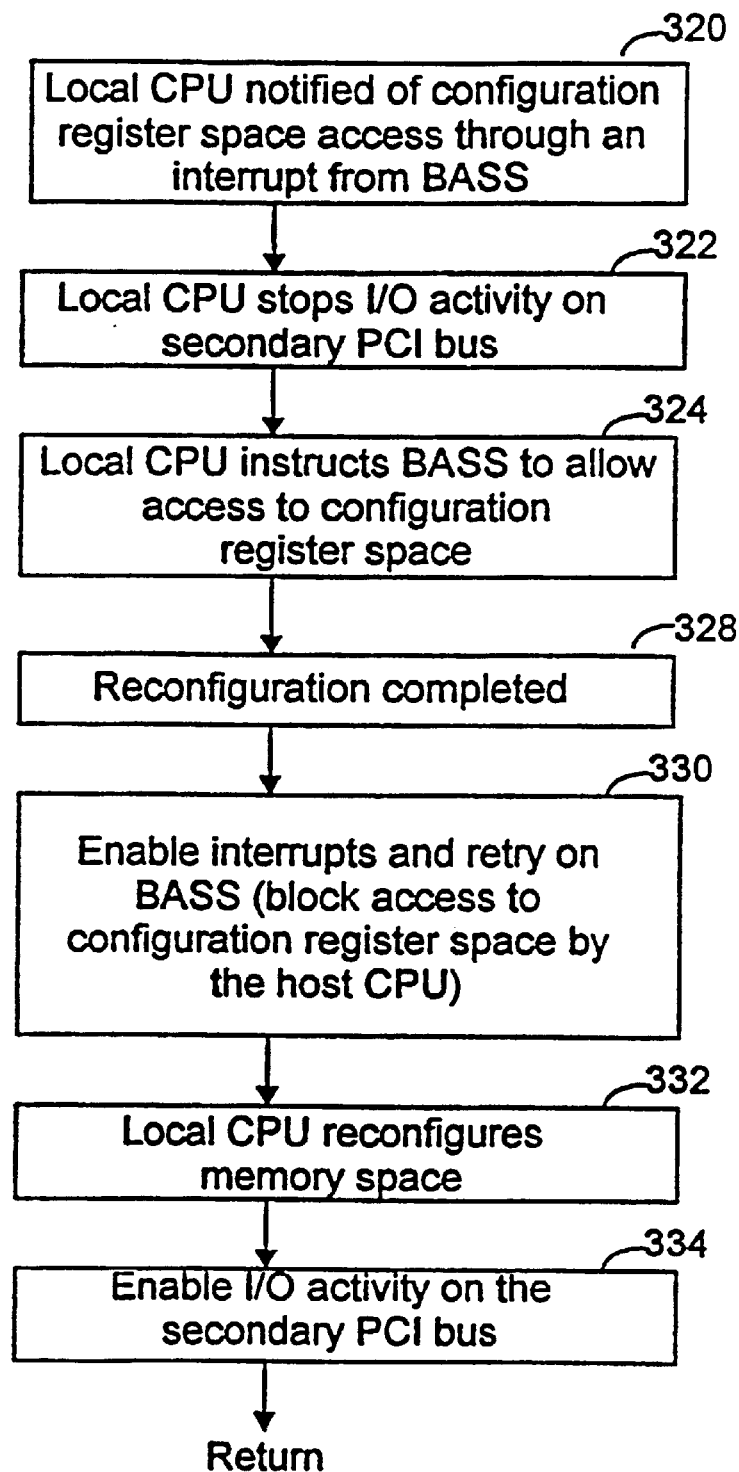
FIG. 16 is a flow chart illustrating the steps used to reconfigure the PCI devices in accordance with a preferred embodiment of the present invention.

FIG. 16 illustrates the steps used by the local CPU 214 to accommodate a reconfiguration request. The local CPU 214 is notified of configuration register space accesses through an interrupt, IRQ, generated from BASS 212 (step 320). The Local-to-PCI bridge 210 asserts the IRQ signal to the local CPU 214 when the BASS 212 receives a transaction that attempts to read the first configuration register space 258 and/or the Local-to-PCI bridge's configuration register space 248 (step 320). The BASS control logic unit 254 generates the BASSINT signal when the interrupt status (INTEN) register in the second configuration register space 260 is enabled (see FIG. 12) and the IDSEL and/or MEMIDSEL signal is asserted. The BASSINT signal is received by the Local-to-PCI bridge 210 which in turn enables the IRQ signal to the local CPU 214.

In response to the IRQ signal, the controller procedure 236 stops the I/O activity on the secondary PCI bus 208 (step 322). This is accomplished by the controller procedure 236 disabling the I/O_flag 234 thereby indicating that all future I/O activity is temporarily halted. In addition, the controller procedure 236 polls the I/O_count 232 datum until the value of the I/O_count 232 datum indicates that all outstanding I/O transactions have completed. When these conditions are satisfied, I/O activity is temporarily halted and the controller procedure 236 proceeds.

The controller procedure 236 then initiates the appropriate instructions to allow access to the BASS's first configuration register space 258 (step 324). This is accomplished by using the CTLIDSEL signal to access the retry enable register in the second configuration register space 260 in order to set the retry enable register to the appropriate settings that allow such access which are shown in FIG. 13.

Once the appropriate settings have been made, the operating system is able to access the first configuration register space 258 and the configuration register space 248 of the Local-to-PCI bridge 210 in order to allocate a memory space that may differ from the one configured by the initial configuration process. This new memory space is updated in the PCI-to-PCI bridge's configuration register space 207 as well.

The reconfiguration process is presumed to be completed within a prescribed time limit from when the retry enable register was modified to allow access by the host system 220 (step 328). Preferably, the time limit is 100 milliseconds. At this point, the controller procedure 236 enables interrupts and retry on BASS by generating the appropriate instructions that set the retry enable register and the interrupt status register to the appropriate settings which are shown in FIGS. 12 and 13 (step 330).

The controller procedure 236 then partitions the newly allotted memory space between the interface controllers 218 and updates the base register settings for each interface controller 218 in the memory 216 (step 332). In addition, the controller procedure 236 generates instructions that access the configuration register space of each interface controller 218 in order to update the corresponding base address register (step 332).

The controller procedure 236 then resumes the I/O activity by enabling the I/O flag 234 (step 334). The I/O activity then proceeds using the reconfigured memory addresses.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

The present invention has been described with reference to a RAID controller. However, the present invention is not limited to a RAID controller and is applicable to any type of intelligent controller or processing unit that controls devices that are coupled to a secondary PCI bus. Examples of such devices include but are not limited to switches, routers, network controllers, and the like.

Furthermore, the present invention has been described with reference to the PCI system architecture and is not limited to this particular architecture. The present invention is applicable to any type of bus architecture.

What is claimed is:

1. A data processing system, comprising:
    a host computer comprising a first processor and a system memory comprising a plurality of memory address spaces, the system memory under the control of the first processor;
    a first bus in communication with the first processor and the system memory;
    a controller connected to the first bus comprising a second processor; and, a second bus connected to a plurality of VO devices and the controller, each of the I/O devices associated with a select portion of a first memory address space of the system memory, the first memory address space under the control of the second processor, the first memory address space used by each of the I/O devices to communicate with the second processor.

2. The system of claim 1, wherein the controller further comprises:
   a first processing device coupled to the second bus, the first processing device having a first configuration register space used by the first processor to acquire the first memory address space from the system memory; and
   wherein the second processor distributes select portions of the first memory address space to each of the I/O devices.

3. The system of claim 2, wherein the controller further comprises:
   a local memory; and
   a second processing device coupled to the second bus, the second processing device having a second configuration register space used by the first processor to acquire a second memory address space from the system memory, the second memory address space used by the second processor to transmit data between the local memory and the I/O devices.

4. The system of claim 3, wherein the controller further comprises
   a bridge coupling the first bus to the second bus.

5. The system of claim 3, wherein the first processor configures the first and second processing devices by executing a configuration procedure that handles one or more interrupt signals generated by at least one of the first processor or the second processor to allocate one or more blocks of system memory to the first and second processing devices.

6. The system of claim 1,
   wherein the first bus is a primary Peripheral Component Interconnect (PCI) bus; and, wherein the second bus is a secondary PCI bus.

7. The system of claim 1, wherein the controller is a RAID controller, for managing I/O requests from the first processor to one or more RAID I/O storage devices.

8. A data processing system, comprising:
   a host system comprising a first processing unit operatively coupled to a system memory comprising a plurality of memory address spaces;
   a first Peripheral Component Interconnect (PCI) bus in communication with the first processing unit and the system memory;
   a second PCI bus;
   a controller comprising a second processor in communication with the second PCI bus;
   one or more exposed PCI devices connected to the second PCI bus, each exposed PCI device using a select memory address space of the system memory;
   a plurality of hidden PCI devices connected to the second PCI bus; and,
   a PCI-to-PCI bridge coupling the first PCI bus to the second PCI bus.

9. The system of claim 8, further comprising a first exposed PCI device, including a first memory address space under the control of the second processor, the first memory address space distributed into a plurality of memory address subspaces, each subspace assigned to a select one of the hidden PCI devices, the hidden PCI devices using the memory address subspaces to transmit data to and from the second processor.

10. The system of claim 9, further comprising:
    a local memory in communication with the second PCI bus; and
    a second exposed PCI device connected to the second PCI bus, the second exposed PCI device including a second memory address space of the system memory, the second memory address space used to transmit data between the hidden PCI devices and the local memory.

11. The system of claim 8, wherein the second processor, the one or more exposed PCI devices, and the PCI-PCI bridge are operatively coupled to a RAID controller, for managing I/O requests from the first processor to one or more RAID I/O storage devices.

12. The system of claim 10,
    wherein the first exposed PCI device includes a first configuration register space; and,
    wherein the second exposed PCI device includes a second configuration register space; and,
    wherein the first exposed PCI device being operatively coupled to a first IDSEL signal line and a second IDSEL signal line, the first IDSEL signal line used by the first processing unit to access the first configuration register space, the second IDSEL signal line being used by the first processing unit to access the second configuration register space.

13. The system of claim 12, wherein
    the first exposed PCI device includes a third configuration register space;
    the second exposed PCI device is coupled to a third IDSEL line that is used by the second exposed PCI device to access the third configuration register space; and,
    wherein a portion of the third configuration register space is used to set values in the first configuration register space, and wherein a portion of the first configuration register space is mapped into a corresponding portion of the third configuration register space.

14. The system of claim 12, wherein
    the first exposed PCI device generates an interrupt signal when the first IDSEL signal or the second IDSEL signal is raised, the interrupt signal being transmitted to the second processor.

15. The system of claim 13, wherein the third configuration register space includes a retry mechanism that controls access to the first and second configuration register spaces.

16. The system of claim 10, wherein
    each hidden PCI device includes a configuration register space; and, wherein
    the second exposed PCI device is operatively coupled to a plurality of hidden IDSEL signal lines under the control of the second processor, each hidden IDSEL signal line routed to a selected hidden PCI device and used by the first processor to access a respective configuration register space.

17. A method for processing data in a data processing system including a host processing unit and a second processing unit connected through a first bus, the host processing unit including a system memory and a first processor, the second processing unit including a second bus, a second processor, and a bridge, the second bus including a plurality of bus devices, the bridge coupling the first bus to the second bus, the second processor in communication with the second bus, said method comprising the steps of:
    allocating a first memory space from the system memory to a first exposed bus device, the first exposed bus device accessible by the host processing unit;
    partitioning, by the second processor, the first memory space into a plurality of segments;

assigning, by the second processor, each segment to a respective hidden bus device;

transmitting data from one hidden bus device to a second hidden bus device through the respective assigned segments; and, wherein said allocating step further comprises steps of:

providing the first exposed bus device with a first configuration register space;

accessing the first configuration register space to determine an amount of the first memory space; and indicating in the first configuration register space a location of the first memory space.

18. A method for processing data in a data processing system that includes a host processing unit and a second processing unit connected through a first bus, the host processing unit including a system memory and a first processor, the second processing unit including a second bus, a second processor, and a bridge, the second bus being operatively coupled to a plurality of bus devices, the bridge coupling the first bus to the second bus, the second processor in communication with the second bus, said method comprising steps of:

allocating, by the host processor, a first memory space from the system memory to a first exposed bus device, the first exposed bus device accessible by the host processing unit;

partitioning, by the second processor, the first memory space into a plurality of memory segments;

assigning, by the second processor, a respective memory segment to a respective hidden bus device; and transmitting data, by the second processor, from one hidden bus device to a second hidden bus device through the respective assigned memory segments.

19. The method of claim 18, wherein said assigning step further comprises steps of:

providing each hidden bus device with a configuration register space;

accessing each configuration register space of each hidden bus device through a select IDSEL signal that is controlled by the second processor; and, setting each configuration register space of each hidden bus device with a location of a respective segment of the first memory space.

20. The method of claim 18, further comprising steps of:

obtaining a second memory space from the system memory to a second exposed PCI device; and, transmitting data between the first processor to the second processor through the second memory space.

21. The method of claim 20, wherein said obtaining step further comprises steps of:

providing the second exposed bus device with a second configuration register space;

using a second IDSEL signal accessible by the host system to access the second configuration register space;

routing the second IDSEL signal through the first exposed bus device to the second exposed bus device; and, utilizing the second IDSEL signal to determine an amount of the second memory space and to store a location of the second memory space in the second configuration register space.

22. The method of claim 20, further comprising steps of:

providing the bridge with a third configuration register space; and, indicating in the third configuration register space the locations of the first and second memory address space.

23. The method of claim 18, further comprising steps of:

reconfiguring the first memory space to a new location;

repartitioning, by the second processor, the new first memory space into a plurality of new segments; and, reassigning, by the second processor, each new segment to a respective hidden bus device.

24. The method of claim 23, wherein said reconfiguring step includes steps of:

determining access to the first and/or second configuration register space;

ceasing I/O activity on the second bus; and, allowing reconfiguration of the location of the first and/or second configuration register space.

25. The method of claim 24, further comprising a step of:

activating I/O activity on the second bus.

26. The method of claim 24, wherein said determining step further comprises steps of:

disabling access to at least one of the first or second configuration register space; and, generating an interrupt when access to the first and/or second configuration register space occurs.

27. The method of claim 24, wherein said allowing step further comprises steps of:

enabling access to at least one of the first or second configuration register space;

performing the reconfiguration; and, disabling access to at least one of the first or second configuration register space.

28. The method of claim 18, wherein said allocating step further comprises steps of:

providing the first exposed bus device with a first configuration register space;

accessing, by the first processor, the first configuration register space to determine an amount of the first memory space; and, indicating in the first configuration register space a location of the first memory space.

29. The method of claim 28, wherein said accessing step further comprises steps of:

using an IDSEL signal accessible by the host system to access the first configuration register space; and, wherein said indicating step further comprises a step of using the IDSEL signal to write the location in the first configuration register space.

30. An apparatus comprising:

a first bridge for coupling a first component bus to a second component bus, the first component bus for coupling to a host processor and a system memory under the control of the host processor, the second component bus for coupling to one or more I/O devices;

a first processor operatively coupled to a local bus, the local bus being coupled to a second bridge, the second bridge also being coupled to the second component bus; and, a first processing device for coupling to the second component bus, the first processing device having a first configuration register space used by the host computer to obtain a first memory address space of the system memory, the first memory address space being used by the one or more I/O devices to communicate with the first processor.

31. The apparatus of claim 30, further comprising:
a local memory under the control of the first processor and operatively coupled to the local bus; and,
a second processing device having a second configuration register space for use by the host computer to obtain a select portion of the local memory for I/O data transfers, by the first processor between the select portion and the I/O devices.

32. The apparatus of claim 30, wherein the first processor distributes select portions of the first memory address space to each of the I/O devices.

33. The apparatus of claim 30, wherein the first component bus is a primary Peripheral Component Interconnect (PCI) bus; and wherein the second component bus is a secondary PCI bus.

34. The apparatus of claim 30, wherein the first processing device is operatively coupled to a first signal line, the first signal line being used by the host processor to access the first configuration register space.

35. The apparatus of claim 31, wherein the second processing device is operatively coupled to a second signal line, the second signal line being used by the host processor to access the second configuration register space.

36. The apparatus of claim 31, wherein the first processing device further comprises:
a third configuration register space; and,
wherein the first processing device and the second processing device are operatively coupled to a third signal line that is used by the second processing device to access the third configuration register space.

37. The apparatus of claim 36, wherein the first processing device generates an interrupt signal when the first signal line or the third signal line is raised, the interrupt signal being transmitted to the host processor.

38. The apparatus of claim 31, wherein the second processing device is operatively coupled to a plurality of hidden signal lines under the control of the first processor, each hidden signal line being routed to selected I/O devices, each I/O device having a respective configuration register space, each hidden signal line being used by the first processor to access a respective configuration register space.

39. A RAID Controller comprising:
first bridge for coupling to a first component bus to a second component bus, the first component bus for coupling to a host processor and a system memory under the control of the host processor, the second component bus for coupling to one or more I/O devices;
a first processor operatively coupled to a local bus. The local bus being coupled to a second bridge, the second bridge also being coupled to the second component bus; and,
a first processing device for coupling to the second component bus, the first processing device having a first configuration register space used by the host computer to obtain a first memory address space of the system memory, the first memory address space being used by the one or more I/O devices to communicate with the first processor.

40. A data processing system, comprising:
a first processing unit including a system memory having a plurality of memory address spaces;
a first Peripheral Component Interconnect (PCT) bus in communication with the first processing unit;
a second PCI bus;
a second processor in communication with the second PCI bus;
one or more exposed PCI devices connected to the second PCI bus, each exposed PCI device including a select memory address space of the system memory;
a plurality of hidden PCI devices connected to the second PCI bus;
a PCI-to-PCI bridge coupling the first PCI bus to the second PCI bus;
a first exposed PCI device, including a first memory address space under the control of the second processor, the first memory address space distributed into a plurality of memory address subspaces, each subspace assigned to a select one of the hidden PCI devices, the hidden PCI devices using the memory address subspaces to transmit data to and from the second processor;
a local memory in communication with the second PCI bus; and
a second exposed PCI device connected to the second PCI bus, the second exposed PCI device including a second memory address space of the system memory, the second memory address space used to transmit data between the hidden PCI devices and the local memory;
wherein
the first exposed PCI device includes a first configuration register space;
wherein the second exposed PCI device including a second configuration register space; and,
wherein the first exposed PCI device is operatively coupled to a first IDSEL signal line and a second IDSEL signal line, the first IDSEL signal line used to access the first configuration register space, the second IDSEL signal line transmitted to the second exposed PCI device to access the second configuration register space.

41. A method for processing data in a data processing system that includes a host processing unit and a second processing unit connected through a first bus, the host processing unit including a system memory and a first processor, the second processing unit including a second bus, a second processor, and a bridge, the second bus being operatively coupled to a plurality of bus devices, the bridge coupling the first bus to the second bus, the second processor in communication with the second bus, said method comprising steps of:
allocating, by the host processor, a first memory space from the system memory to a first exposed bus device, the first exposed bus device accessible by the host processing unit;
partitioning, by the second processor, the first memory space into a plurality of memory segments;
assigning, by the second processor, a respective memory segment to a respective hidden bus device;
transmitting data, by the second processor, from one hidden bus device to a second hidden bus device through the respective assigned memory segments;
obtaining a second memory space from the system memory to a second exposed PCI device; and,
transmitting data between the first processor to the second processor through the second memory space.

42. The method of claim 41, wherein said obtaining step further comprises steps of:
providing the second exposed bus device with a second configuration register space;

using a second IDSEL signal accessible by the host system to access the second configuration register space;

routing the second IDSEL signal through the first exposed bus device to the second exposed bus device; and, utilizing the second IDSEL signal to determine an amount of the second memory space and to store a location of the second memory space in the second configuration register space.

43. The method of claim 41, further comprising steps of:

providing the bridge with a third configuration register space; and, indicating in the third configuration register space the locations of the first and second memory address space.

44. The method of claim 41, further comprising steps of:

reconfiguring the first memory space to a new location;

repartitioning, by the second processor, the new first memory space into a plurality of new segments; and, reassigning, by the second processor, each new segment to a respective hidden bus device.

45. The method of claim 44, wherein said reconfiguring step includes steps of:

determining access to the first and/or second configuration register space;

ceasing I/O activity on the second bus; and, allowing reconfiguration of the location of the first and/or second configuration register space.

46. The method of claim 45, further comprising a step of:

I/O activity on the second bus.

47. The method of claim 45, wherein said determining step further comprises steps of:

disabling access to at least one of the first or second configuration register space; and, generating an interrupt when access to the first and/or second configuration register space occurs.

48. The method of claim 45, wherein said allowing step further comprises steps of:

enabling access to at least one of the first or second configuration register space;

performing the reconfiguration; and, disabling access to at least one of the first or second configuration register space.

49. A data processing system, comprising:

a first processor;

a system memory including a plurality of memory address spaces, the system memory under the control of the first processor;

a first bus in communication with the first processor and the system memory;

a controller connected to the first bus including a second processor;

a second bus connected to a plurality of I/O devices and the controller, each of the I/O devices associated with a select portion of a first memory address space of the system memory, the first memory address space under the control of the second processor, the first memory address space used by each of the I/O devices to communicate with the second processor;

a first processing device coupled to the second bus, the first processing device having a first configuration register space used by the first processor to acquire the first memory address space from the system memory, wherein the second processor distributes select portions of the first memory address space to each of the I/O devices;

a local memory; and, a second processing device coupled to the second bus, the second processing device having a second configuration register space used by the first processor to acquire a second memory address space from the system memory, the second memory address space used by the second processor to transmit data between the local memory and the I/O devices, such that the first processor configures the first and second processing devices by executing a configuration procedure that handles one or more interrupt signals generated by at least one of the first processor or the second processor to allocate one or more blocks of system memory to the first and second processing devices.

* * * * *

UNITED STATES PATENT AND TRADEMARK OFFICE
CERTIFICATE OF CORRECTION

PATENT NO. : 6,094,699
DATED : July 25, 2000
INVENTOR(S) : Surugucchi et al.

It is certified that error appears in the above-identified patent and that said Letters Patent is hereby corrected as shown below:

<u>Column 19,</u>
Line 31, add -- activating -- before "I/O".

Signed and Sealed this

Seventh Day of August, 2001

*Attest:*

*Attesting Officer*

NICHOLAS P. GODICI
*Acting Director of the United States Patent and Trademark Office*